(12) United States Patent
Saniei et al.

(10) Patent No.: US 12,397,533 B2
(45) Date of Patent: Aug. 26, 2025

(54) LIGHTWEIGHT MULTILAYER FOAM FILM WITH ENHANCED PERCEIVED SURFACE WHITENESS

(71) Applicant: MuCell Extrusion, LLC, Woburn, MA (US)

(72) Inventors: Mehdi Saniei, Belmont, MA (US); Mark E. Lindenfelzer, Milton, MA (US); Nicholas R. Torraco, Arlington, MA (US); James K. Sakorafos, Shrewsbury, MA (US)

(73) Assignee: MuCell Extrusion, LLC, Woburn, MA (US)

( * ) Notice: Subject to any disclaimer, the term of this patent is extended or adjusted under 35 U.S.C. 154(b) by 231 days.

(21) Appl. No.: 17/064,976

(22) Filed: Oct. 7, 2020

(65) Prior Publication Data

US 2021/0101372 A1 Apr. 8, 2021

Related U.S. Application Data

(60) Provisional application No. 62/911,820, filed on Oct. 7, 2019.

(51) Int. Cl.
*B32B 5/18* (2006.01)
*B29C 49/04* (2006.01)
(Continued)

(52) U.S. Cl.
CPC ............ *B32B 27/065* (2013.01); *B29C 49/04* (2013.01); *B32B 5/18* (2013.01); *B32B 7/022* (2019.01); *B32B 7/023* (2019.01); *B32B 27/08* (2013.01); *B32B 27/20* (2013.01); *B32B 27/32* (2013.01); *B32B 27/36* (2013.01); *B32B 33/00* (2013.01); *B32B 37/153* (2013.01); *B32B 38/0032* (2013.01); *B65D 65/16* (2013.01); *B65D 81/03* (2013.01); *B65D 81/34* (2013.01); *C08J 9/0066* (2013.01); *C08J 9/12* (2013.01); *B29C 48/0012* (2019.02); *B29C 48/0021* (2019.02); *B29C 48/022* (2019.02); *B29C 48/08* (2019.02); *B29C 48/10* (2019.02); *B29C 48/185* (2019.02); *B29C 48/21* (2019.02); *B29C 48/49* (2019.02); *B29C 48/92* (2019.02); *B29K 2023/065* (2013.01); *B29K 2105/04* (2013.01); *B29K 2105/046* (2013.01); *B29L 2009/00* (2013.01); *B29L 2031/712* (2013.01); *B32B 5/20* (2013.01); *B32B 27/302* (2013.01); *B32B 27/304* (2013.01); *B32B 27/306* (2013.01); *B32B 27/308* (2013.01); *B32B 27/34* (2013.01); *B32B 27/40* (2013.01); *B32B 2038/0084* (2013.01); *B32B 2250/03* (2013.01); *B32B 2250/05* (2013.01); *B32B 2250/24* (2013.01); *B32B 2250/242* (2013.01); *B32B 2250/40* (2013.01); *B32B 2264/102* (2013.01); *B32B 2264/104* (2013.01); *B32B 2264/108* (2013.01); *B32B 2266/02* (2013.01); *B32B 2266/0214* (2013.01); *B32B 2266/025* (2013.01); *B32B 2266/08* (2013.01); *B32B 2266/104* (2016.11); *B32B 2272/00* (2013.01); *B32B 2305/02* (2013.01); *B32B 2307/402* (2013.01); *B32B 2307/4026* (2013.01); *B32B 2307/406* (2013.01); *B32B 2307/41* (2013.01); *B32B 2307/416* (2013.01); *B32B 2307/718* (2013.01); *B32B 2307/72* (2013.01); *B32B 2307/732* (2013.01); *B32B 2311/18* (2013.01); *B32B 2311/20* (2013.01);
(Continued)

(58) Field of Classification Search
None
See application file for complete search history.

(56) References Cited

U.S. PATENT DOCUMENTS 3,783,088 A * 1/1974 Yoshiyasu ............... B32B 27/00
428/323
4,318,950 A * 3/1982 Takashi ................... B32B 27/08
428/150
(Continued)

FOREIGN PATENT DOCUMENTS

CN 1229027 A * 9/1999
CN 101015974 A * 8/2007 ......... B29C 47/0021
(Continued)

OTHER PUBLICATIONS

Hunterlab, Tint Indices, 2008 (no month) (Year: 2008).*
Machine Translation of JP-07241966-A, Sep. 1995 (Year: 1995).*

*Primary Examiner* — Jeffrey A Vonch
(74) *Attorney, Agent, or Firm* — Wolf, Greenfield & Sacks, P.C.

(57) ABSTRACT

A multilayer foam film with an enhanced perceived surface whiteness comprising for light-blocking, signage, and general packaging application is disclosed. In an embodiment, the film has a bulk density of less than 0.962 gr/cm³ wherein more than 50% of the cells in the foam layer are closed cells. In an embodiment, the multilayer foam film has a thickness greater than 1 mil and one of the solid skin layers contains white pigment. In another embodiment the white skin layer has a skin whiteness value of greater than 80 according to ASTM E313-73, and a skin layer tint value of less than 1 according to ASTM E313-73, and The lightness value (L*) of the white skin layer of greater than 90 in CIE L*a*b* dimension according to ASTM E308. In an embodiment, the film has a very smooth surface with a smoothness value of less than 25 in Sheffield smoothness unit configuration according to TAPPI T 538.

19 Claims, No Drawings

(51) Int. Cl.
*B32B 7/022* (2019.01)
*B32B 7/023* (2019.01)
*B32B 27/06* (2006.01)
*B32B 27/08* (2006.01)
*B32B 27/20* (2006.01)
*B32B 27/32* (2006.01)
*B32B 27/36* (2006.01)
*B32B 33/00* (2006.01)
*B32B 37/15* (2006.01)
*B32B 38/00* (2006.01)
*B65D 65/16* (2006.01)
*B65D 81/03* (2006.01)
*B65D 81/34* (2006.01)
*C08J 9/00* (2006.01)
*C08J 9/12* (2006.01)
*B29C 48/00* (2019.01)
*B29C 48/08* (2019.01)
*B29C 48/10* (2019.01)
*B29C 48/18* (2019.01)
*B29C 48/21* (2019.01)
*B29C 48/49* (2019.01)
*B29C 48/92* (2019.01)
*B29K 23/00* (2006.01)
*B29K 105/04* (2006.01)
*B29L 9/00* (2006.01)
*B29L 31/00* (2006.01)
*B32B 5/20* (2006.01)
*B32B 27/30* (2006.01)
*B32B 27/34* (2006.01)
*B32B 27/40* (2006.01)
*B65D 75/26* (2006.01)
*C08J 5/18* (2006.01)
*C08K 3/013* (2018.01)
*C08K 3/04* (2006.01)
*C08K 3/22* (2006.01)
*C08K 3/26* (2006.01)
*C08K 5/00* (2006.01)
*G09F 3/02* (2006.01)

(52) U.S. Cl.
CPC ....... *B32B 2313/04* (2013.01); *B32B 2315/16* (2013.01); *B32B 2323/04* (2013.01); *B32B 2323/043* (2013.01); *B32B 2323/046* (2013.01); *B32B 2323/10* (2013.01); *B32B 2329/04* (2013.01); *B32B 2439/46* (2013.01); *B32B 2439/70* (2013.01); *B32B 2590/00* (2013.01); *B65D 75/26* (2013.01); *B65D 2301/20* (2013.01); *B65D 2577/2025* (2013.01); *C08J 5/18* (2013.01); *C08J 9/0014* (2013.01); *C08J 2203/10* (2013.01); *C08J 2205/044* (2013.01); *C08J 2205/052* (2013.01); *C08K 3/013* (2018.01); *C08K 3/04* (2013.01); *C08K 2003/2237* (2013.01); *C08K 2003/2241* (2013.01); *C08K 2003/265* (2013.01); *C08K 5/0083* (2013.01); *C08K 2201/019* (2013.01); *G09F 2003/0257* (2013.01); *G09F 2003/0272* (2013.01); *Y10S 428/9033* (2013.01); *Y10S 428/9133* (2013.01); *Y10T 428/24942* (2015.01); *Y10T 428/2495* (2015.01); *Y10T 428/24967* (2015.01); *Y10T 428/249975* (2015.04); *Y10T 428/249976* (2015.04); *Y10T 428/249977* (2015.04); *Y10T 428/249978* (2015.04); *Y10T 428/249979* (2015.04); *Y10T 428/249991* (2015.04); *Y10T 428/249994* (2015.04); *Y10T 428/269* (2015.01); *Y10T 428/31* (2015.01)

(56) References Cited

U.S. PATENT DOCUMENTS

| | | | | |
|---|---|---|---|---|
| 4,377,616 A * | 3/1983 | Ashcraft | ............... | B32B 27/08 428/323 |
| 4,452,846 A * | 6/1984 | Akao | ............... | B32B 7/12 428/323 |
| 4,560,614 A * | 12/1985 | Park | ............... | B32B 27/20 428/338 |
| 4,632,869 A * | 12/1986 | Park | ............... | B32B 27/08 428/327 |
| 4,698,261 A * | 10/1987 | Bothe | ............... | B32B 27/20 428/352 |
| 4,741,950 A * | 5/1988 | Liu | ............... | B29C 48/21 428/317.9 |
| 4,758,462 A * | 7/1988 | Park | ............... | B32B 27/32 428/317.9 |
| 4,871,784 A * | 10/1989 | Otonari | ............... | C08J 5/18 521/97 |
| 4,965,123 A * | 10/1990 | Swan | ............... | B32B 27/205 428/317.9 |
| 5,176,954 A * | 1/1993 | Keller | ............... | B32B 27/20 428/323 |
| 5,233,924 A * | 8/1993 | Ohba | ............... | B32B 27/18 428/315.7 |
| 5,372,669 A * | 12/1994 | Freedman | ............... | B32B 27/20 156/244.11 |
| 5,397,635 A * | 3/1995 | Wood, Jr. | ............... | B32B 27/32 428/483 |
| 5,552,011 A * | 9/1996 | Lin | ............... | B32B 37/06 264/41 |
| 5,773,136 A * | 6/1998 | Alder | ............... | B32B 7/06 428/354 |
| 5,800,913 A * | 9/1998 | Mauer | ............... | B32B 38/0012 428/458 |
| 5,866,053 A * | 2/1999 | Park | ............... | B29C 44/348 264/68 |
| 5,891,555 A * | 4/1999 | O'Brien | ............... | B32B 27/08 428/339 |
| 5,972,490 A * | 10/1999 | Crighton | ............... | B32B 27/32 428/317.9 |
| 6,020,116 A * | 2/2000 | Camp | ............... | G03C 1/95 430/536 |
| 6,183,856 B1 * | 2/2001 | Amon | ............... | B32B 27/08 428/318.4 |
| 6,194,060 B1 * | 2/2001 | Amon | ............... | B32B 27/08 428/318.6 |
| 6,306,490 B1 * | 10/2001 | Biddiscombe | ............... | B32B 5/18 428/315.7 |
| 6,364,988 B1 * | 4/2002 | Lin | ............... | B29C 48/08 264/45.9 |
| 6,368,543 B1 * | 4/2002 | Lin | ............... | B29C 48/21 264/45.9 |
| 6,376,058 B1 * | 4/2002 | Schut | ............... | C08L 23/12 525/227 |
| 6,379,605 B1 * | 4/2002 | Lin | ............... | B29C 48/08 264/45.9 |
| 6,436,219 B1 * | 8/2002 | Francis | ............... | C08J 5/18 156/244.11 |
| 6,447,976 B1 * | 9/2002 | Dontula | ............... | B41M 5/508 430/536 |
| 6,593,384 B2 * | 7/2003 | Anderson | ............... | B29C 44/348 521/142 |
| 6,596,385 B1 * | 7/2003 | Perez | ............... | B32B 27/20 428/215 |
| 6,946,203 B1 * | 9/2005 | Lockhart | ............... | B32B 3/26 428/910 |
| 2001/0047042 A1* | 11/2001 | Anderson | ............... | B29C 44/348 521/29 |
| 2002/0004129 A1* | 1/2002 | Hibiya | ............... | B32B 7/02 428/315.7 |

(56) References Cited

U.S. PATENT DOCUMENTS

| | | | |
|---|---|---|---|
| 2002/0160215 A1* | 10/2002 | Peiffer | B29C 55/143 428/480 |
| 2002/0187361 A1* | 12/2002 | Amon | B32B 27/32 428/318.6 |
| 2003/0035944 A1* | 2/2003 | Blackwell | B32B 27/302 428/473.5 |
| 2003/0089450 A1* | 5/2003 | Lin | B29C 48/307 264/173.14 |
| 2003/0129373 A1* | 7/2003 | Migliorini | B32B 3/20 428/517 |
| 2003/0203156 A1* | 10/2003 | Hiraishi | B29C 44/3469 428/131 |
| 2003/0203184 A1* | 10/2003 | Sunderrajan | B32B 5/18 428/319.3 |
| 2003/0211309 A1* | 11/2003 | DiLuzio | B32B 27/32 428/318.6 |
| 2005/0181196 A1* | 8/2005 | Aylward | G03G 7/008 428/314.4 |
| 2005/0260427 A1* | 11/2005 | Kochem | B29C 49/22 428/523 |
| 2006/0024518 A1* | 2/2006 | Kong | B32B 27/18 428/343 |
| 2006/0057347 A1* | 3/2006 | Squier | B32B 27/30 428/522 |
| 2006/0121259 A1* | 6/2006 | Williams | B32B 27/205 428/521 |
| 2007/0120283 A1* | 5/2007 | Hostetter | B32B 37/153 264/102 |
| 2008/0009413 A1* | 1/2008 | O'Brien | B41M 5/42 503/227 |
| 2008/0138593 A1* | 6/2008 | Martinez | C08J 9/0061 521/134 |
| 2008/0251181 A1* | 10/2008 | Quintens | B41M 5/41 156/60 |
| 2009/0011183 A1* | 1/2009 | Kochem | B32B 27/32 264/279.1 |
| 2010/0119799 A1* | 5/2010 | Manrich | C08L 23/10 524/427 |
| 2010/0242326 A1* | 9/2010 | Saxen | B29C 55/14 264/45.6 |
| 2010/0301510 A1* | 12/2010 | Coburn | B29C 48/08 428/315.9 |
| 2011/0123753 A1* | 5/2011 | Koger | B41M 5/504 428/40.1 |
| 2011/0214794 A1* | 9/2011 | Kochem | B32B 27/08 427/256 |
| 2011/0268934 A1* | 11/2011 | Tews | B29C 55/023 264/259 |
| 2012/0228793 A1* | 9/2012 | Lindenfelzer | B29C 48/10 264/50 |
| 2014/0020749 A1* | 1/2014 | Lacrampe | H10F 19/804 428/480 |
| 2014/0079938 A1* | 3/2014 | Perick | B32B 27/32 428/220 |
| 2014/0308496 A1* | 10/2014 | Bafna | B32B 27/205 428/218 |
| 2014/0376835 A1* | 12/2014 | Rogers | B32B 27/065 383/105 |
| 2015/0030266 A1* | 1/2015 | Borchardt | B32B 38/14 156/218 |
| 2015/0123302 A1* | 5/2015 | Lehrter | H05K 999/99 264/45.3 |
| 2015/0165734 A1* | 6/2015 | Dupre | B29C 49/2408 428/141 |
| 2015/0234098 A1* | 8/2015 | Lofftus | D06N 3/0065 428/313.5 |
| 2016/0059515 A1* | 3/2016 | Perick | B32B 27/08 428/220 |
| 2016/0089864 A1* | 3/2016 | Suzuki | B32B 27/34 428/483 |
| 2018/0099798 A1* | 4/2018 | Lehrter | B32B 27/08 |
| 2018/0333935 A1* | 11/2018 | Marchal | B32B 7/12 |
| 2019/0001648 A1* | 1/2019 | Ambroise | B32B 7/12 |
| 2019/0176503 A1* | 6/2019 | Harada | C08J 7/046 |
| 2020/0123363 A1* | 4/2020 | Liao | C08L 23/16 |
| 2020/0171786 A1* | 6/2020 | Saniei | B32B 27/40 |
| 2020/0270395 A1* | 8/2020 | Peer | C08G 63/183 |
| 2022/0325096 A1* | 10/2022 | Wieloch | C08L 67/02 |

FOREIGN PATENT DOCUMENTS

| | | | | |
|---|---|---|---|---|
| CN | 101618622 | A | * | 1/2010 |
| CN | 101633261 | A | * | 1/2010 |
| CN | 103240885 | A | * | 8/2013 |
| CN | 104943308 | A | * | 9/2015 ............ B32B 27/08 |
| CN | 106739360 | A | * | 5/2017 |
| CN | 108162533 | A | * | 6/2018 |
| DE | 19546457 | A1 | * | 6/1997 ............ B32B 27/32 |
| DE | 10033659 | A1 | * | 1/2002 ............ B29C 48/08 |
| DE | 10042332 | A1 | * | 3/2002 ............ B29C 48/08 |
| EP | 0083167 | A1 | * | 7/1983 |
| EP | 360201 | A2 | * | 3/1990 ......... B32B 27/065 |
| EP | 408971 | A2 | * | 1/1991 ............ B32B 27/18 |
| EP | 605938 | A1 | * | 7/1994 ............ B32B 27/20 |
| EP | 773094 | A1 | * | 5/1997 ............ B29C 43/22 |
| EP | 795399 | A1 | * | 9/1997 ............ B32B 27/08 |
| EP | 824076 | A1 | * | 2/1998 ............ B32B 27/08 |
| EP | 1310357 | A1 | * | 5/2003 ........ B29C 47/0021 |
| GB | 1384556 | A | * | 2/1975 .......... B29C 55/026 |
| GB | 2439051 | A | * | 12/2007 .......... B29C 55/005 |
| JP | 61165755 | A | * | 7/1986 ............... G03C 8/52 |
| JP | 07241966 | A | * | 9/1995 |
| JP | 2000264325 | A | * | 9/2000 |
| JP | 2011012268 | A | * | 1/2011 ............ B41M 5/41 |
| KR | 2014086142 | A | * | 7/2014 ............ B32B 27/36 |
| RU | 2599586 | C1 | * | 10/2016 |
| TH | 161773 | A | * | 4/2017 .......... G01N 17/004 |
| TW | 201109382 | A | * | 3/2011 |
| WO | WO-8908023 | A1 | * | 9/1989 .......... B29C 55/005 |
| WO | WO-9304860 | A1 | * | 3/1993 ............ B32B 27/08 |
| WO | WO-9721541 | A1 | * | 6/1997 ............ B32B 27/32 |
| WO | WO-9958336 | A1 | * | 11/1999 ............ B32B 27/08 |
| WO | WO-0012287 | A1 | * | 3/2000 ............... G09F 3/04 |
| WO | WO-0240270 | A1 | * | 5/2002 ............ B32B 27/18 |
| WO | WO-02060688 | A2 | * | 8/2002 ............ B32B 27/08 |
| WO | WO-2005097492 | A1 | * | 10/2005 ............ B32B 27/06 |
| WO | WO-2007052851 | A1 | * | 5/2007 ............ B32B 27/10 |
| WO | WO-2008092328 | A1 | * | 8/2008 ........ B29C 47/0021 |
| WO | WO-2018176770 | A1 | * | 10/2018 ............ B29C 48/18 |
| WO | WO-2019188841 | A1 | * | 10/2019 |

\* cited by examiner

LIGHTWEIGHT MULTILAYER FOAM FILM WITH ENHANCED PERCEIVED SURFACE WHITENESS

RELATED APPLICATION

This application claims priority to U.S. provisional patent application No. 62/911,820 filed on Oct. 7, 2019, which is incorporated herein by reference in its entirety.

FIELD

This invention relates to a multilayer foam film which may be used for paper replacement application in the packaging industry.

BACKGROUND

With the vast demand growth in food packaging in emerging markets, it would be desirable to produce a lightweight recyclable polymeric film that possesses a high surface quality and whiteness for printing purposes. So, a white pigment of some form should be incorporated into plastic products. For example, Titanium dioxide ($TiO_2$) has been widely used as one of the conventional white pigments in various industries. $TiO_2$ is a photo-responsive multifunctional additive in polymer industry that efficiently can scatter all spectrum of the visible light depending on the type and concentration, hence imparting whiteness, brightness, and opacity.

Unlike the other colored pigments that can provide opacity by absorbing some spectrum of visible light, $TiO_2$ and all other similar white pigments can do so by scattering the visible light. In multilayer thermoplastic films, the white pigments, e.g. $TiO_2$, may be incorporated into the skin layers to provide opacity and whiteness. So, all lights striking the surface is being scattered outwards except for the amount that is being absorbed by the polymer or pigments. So, the amount, dispersion, and type of the pigments in the surface can determine how and to what extent the whole structure appears opaque and white.

On the other hand, for various applications, one side of the films might have a different color other than white. For example, in many cases, including for surface protection applications, one side is white, and the other side is black. In this case, some of the lights, excluding the amount that is being scattered by the white pigments, is being absorbed by the black backside which influences the perceived whiteness of the white surface. Therefore, in order to increase the amount of scattered and reflected light and to decrease the amount of light absorption and transmission, the amount of white pigment, e.g. a $TiO_2$ with a higher refraction index, might be increased to address this issue which can increase the whiteness of the surface, which consequently can increase the production cost significantly. So, the question is if the perceived surface whiteness on one side of the multilayer polymer film or sheet can be enhanced, or at least remains intact, when the other side of the same film or sheet has a different color, specifically black, without any increase in white pigment concentration, e.g. $TiO_2$.

SUMMARY

A recyclable lightweight multilayer film with an enhanced perceived surface whiteness for packaging application is described herein. The film can have a very smooth surface with high whiteness and light intensity resulting in superior printing quality.

In one aspect, a coextruded lightweight multilayer thermoplastic film is provided. The film comprises at least one foam layer, including a plurality of cells wherein at least 10% of the cells are closed cells. The film further comprises solid layers on each side of the foam layer. The film has an overall thickness equal to or greater than 1 mil, and the bulk density of less than 1 $gr/cm^3$, and one of the solid skin layers contain white pigment. The white skin layer has a skin whiteness value of greater than 80 according to ASTM E313-73, and a skin layer tint value of less than 1 according to ASTM E313-73, and the lightness value (L*) of the white skin layer of greater than 90 in CIE L*a*b* dimension according to ASTM E308.

The film can have a surface with an average Sheffield smoothness, according to TAPPI T 538, of less than 100.

Other aspects, embodiments, advantages, and features will become apparent from the following detailed description.

DETAILED DESCRIPTION

The singular forms "a," "an," and "the" include plural referents unless the context clearly dictates otherwise.

All ranges disclosed herein are inclusive of the recited endpoint and independently combinable (for example the overall thickness of greater than 1 mils is inclusive of the endpoint, 1 mil.)

As used herein, approximating language may be applied to modify any quantitative representation that may vary without resulting in a change in the basic function to which it is related. Accordingly, a value modified by a term or terms, such as "about" and "substantially," may not be limited to the precise value specified. The modifier "about" should also be considered as disclosing the range defined by the absolute value of the two endpoints. For example, the expression "from about 0.05 to about 15" also discloses the range "from 0.05 to 15".

As used herein, the term "lightweight" refers to the bulk density value of the products described herein being less than, or equal to, the density of their solid counterpart made from the associated base virgin resin, or the density of the associated base virgin resin. In a similar context, it refers to the bulk density value of the products described herein being less than, or at least equal to, the density of the paperboards with the same thickness or with the same weight values per unit area in $gr/m^2$. For example, bulk density values of the products of this invention can be less than 0.962 $gr/cm^3$ which is less than the density value of the associated base virgin resin of 0.962 $gr/cm^3$, or less than the bulk density value of 0.962 $gr/cm^3$ of its solid counterpart made from the associated base virgin resin. In another similar context, it refers to the bulk density value of the products described herein being less than the density of water or 1 $gr/cm^3$.

The present disclosure relates to multilayer lightweight polyethylene foam film or sheet suitable to be used in a wide range of applications such as fast food packaging; packaging of dry food products such as biscuits, cookies, cereals, tea, coffee, sugar, flour, dry food mixes, chocolates, sugar confectioneries, pet food; packaging of frozen foods such as chilled foods and ice creams; backing board for fresh products such as vegetables, fruits, meat, bacon, and fishes; packaging of baked food; packaging of liquid food and beverages such as juice drinks, milk and all sorts of products derived from milk; and packaging of all kinds of laundry detergents, shampoos, and body washes; making all sorts of pouches including stand-up pouches, sachets, pet food boxes, and grocery boxes; all sorts of aseptic packaging to include pasteurized products; packaging of baby foods; packaging of all kinds of desserts; packaging of liquid food and beverages such as broths, soups, juice drinks, milk and all sorts of products derived from milk, concentrates, all kinds of dressing, liquid eggs, and tomato products. Moreover, it can be used in surface protection applications as well as light blocking and signage applications.

Herein a recyclable lightweight multilayer film with enhanced perceived surface whiteness is disclosed which comprises at least three layers, which can be a replacement for paper boards that are being used in packaging industries, for direct and non-direct food contact packaging application. The film comprises polyethylene (PE) wherein at least one layer, excluding the solid skin layers, has a cellular structure, and one of the solid skin layers comprises some apt amount of white pigments, for example, $TiO_2$. In some embodiments, at least 10% of the cells are closed-cell; in some embodiments, more than 50% of the cells are closed cells; and, in some embodiments, more than 75% of the cells are closed cells. As used herein, a "closed cell" refers to a cell that has cell walls that completely surround the cell with no openings such that there is no interconnectivity to an adjacent cell.

Furthermore, the perceived skin whiteness of the disclosed multilayer foamed film product described herein could be improved over their solid counterparts. This could be done first and foremost by the inclusion of a cellular layer in the core of the multilayer film, or the inclusion of a cellular layer as an intermediate layer between the core layer and the white solid skin layer, where it is located adjacent or close to the white solid skin. In another embodiment, an enhanced perceived surface whiteness may be achieved by the inclusion of a cellular layer in between the two solid skin layers of the multilayer film. Secondly, by an accurate tune and alteration of the thickness of the cellular layer as well as the cell size and the cell density. The enhanced perceived surface whiteness in the disclosed products might have been achieved due to an increase in the visible light scattering on the white side of the film following the inclusion of a cellular layer.

In one embodiment, at least one of the intermediate solid layers in the multilayer film described here may comprise of a post-consumer regrind, for example, post-consumer regrind polyethylene (PE).

In some embodiments, a blown film process may be used where the head pressure of the extruder can go high because of a very narrow gap that benefits the nucleation of cells in the foam layer. Using such a technique, the melt fracture should be avoided, and the resin should have excellent thermal stability and high enough melt strength. In some embodiments, all layers of the described multilayer film comprise PE and, in some cases, the polymeric material in one or more of these layers consists essentially of PE. In one embodiment, at least one layer of the multilayer film can comprise LDPE. In some embodiments, the multilayer film can be comprised of nine layers; in some embodiments, eight layers; in some embodiments, seven layers; in some embodiments, six layers; in some embodiments, five layers, in some embodiments, four layers, and, in some embodiments, three layers. For example, a three-layer film may comprise a foam core layer (e.g., comprising PE) and two solid layers (e.g., comprising PE), each one on respective opposite sides of the core layer wherein one of the solid skin layers contains white pigments (e.g., $TiO_2$). In one case, a five-layer foam film comprises a foam core layer (e.g., comprising PE) in between the two solid skin layers each of which are on respective opposite sides of the core layer wherein one of the solid skin layers contains white pigments (e.g., $TiO_2$). In another embodiment, a seven-layer foam film comprises a foam core layer in between the two solid skin layers wherein one of the solid skin layers contains white pigments (e.g., $TiO_2$). In another embodiment, the multilayer film, which can be three, four, five, six, seven, eight, or nine layers, comprises at least one foam layer and two solid skin layers wherein one of the solid skin layers contains white pigments (e.g., $TiO_2$). It should be understood that other layer configurations may be possible.

In one embodiment, the process to produce the described multilayer films may utilize a very small and precise amount of supercritical gas, for example below 0.1 wt %, as a processing aid and blowing agent. Such supercritical gas may be injected into the molten polymer at high pressure, for example greater than 34 bar, inside an efficient and effectual mixer, e.g., cavity transfer mixer, as an extension to the extruder's barrel. The supercritical blowing agent used in the process can be either nitrogen, carbon dioxide or a mixture of nitrogen and carbon dioxide. In some embodiments, the supercritical blowing agent can be introduced inside the mixing section of the extruder at the injection pressure greater than or equal to 34 bar; in some cases, greater than or equal to 70 bar; in some cases, greater than or equal to 240 bar, and, in some cases, greater than or equal to 380 bar. The temperature of the mixer could be accurately controlled within ±1° C. The inclusion of a tiny amount of gas can offer a few important advantages in the process and, for example, blown film extrusion processes. For example, the gas can reduce the backpressure which allows processing at higher throughput and can delay any bubble instability. Therefore, melt fracture could be reduced significantly. Also, the gas can enhance the processing ability of the PE, and to serve as a physical blowing agent with the presence of a nucleating agent in the layer that has a cellular structure. The addition of the physical blowing agent can depress the development of melt fracture due to the viscosity manipulation of the melt which may result in high surface smoothness. Hence the printing quality on the film can be improved significantly.

In general, conventional polymer processing equipment may be used to produce the films described herein. In some cases, for example, the film can be produced by the blown film process using an annular die with a die gap from 0.45 to 1.3 mm and a blow-up ratio ranging from 1.5:1 to 3.5:1. Higher blow-up ratios might result in a more balanced MD/TD (machine direction/transverse direction) orientation, which improves overall film toughness. The die geometry and specification may be manufactured according to, for example, the patent application US 2012/0228793 A1, which is incorporated by reference herein in its entirety.

In some embodiments, suitable foam layers and methods of forming the same have been described, for example, in commonly-owned U.S. patent application Ser. No. 16/875,198, filed on May 15, 2020 and entitled "LIGHTWEIGHT POLYETHYLENE FILM FOR ASEPTIC PACKAGING APPLICATIONS AND THE PRODUCT RESULTING THEREFROM AND THE PROCESS OF MAKING THE SAME" and U.S. patent application Ser. No. 16/415,233, filed May 17, 2019, and entitled "LIGHTWEIGHT POLYETHYLENE FILM FOR FOOD PACKAGING APPLICATIONS AND THE PRODUCT RESULTING THEREFROM AND THE PROCESS OF MAKING THE SAME", both of which are incorporated herein by reference in their entireties.

In some embodiments, suitable foam layers and methods of forming the same have been described, for example, in commonly-owned U.S. Patent Application No. US20200198308A1, filed on Nov. 15, 2019 and entitled "ANISOTROPIC THIN POLYETHYLENE SHEET AND APPLICATIONS THEREOF AND THE PROCESS OF MAKING THE SAME" which is incorporated herein by reference in their entireties.

The majority of the conventional PE blown films are processed using a PE blend comprising LDPE for enhancing bubble stability. Almost all the HDPE films are made in a high stock blown film process; otherwise, the tear strength of the HDPE film deteriorates significantly. As described above, in embodiments of the methods are used for producing the multi-layer films, a supercritical gas may be injected into the melt at a precisely controlled rate, inside a transfer mixer, before entering the annular die. This unit could be controlled as a separate temperature zone with an accuracy of ±1° C. and a gas injection pressure variation below 1%. The plasticization effect of the gas can result in a viscosity change of the molten resin which would enhance the processing ability of the resin inside the annular die at a lower temperature compared to the processing temperature which is being used conventionally. Hence, a relatively stable bubble can be made inside the pocket. Then, because of the overall high specific heat capacity of polyethylene, the transverse stretch of the bubble can be delayed until the film becomes cooler, which may further enhance the bubble stability and the frost line height. This also might be beneficial in manipulating the crystallization kinetics of the skin layers to improve a few other physio-mechanical properties.

In some embodiments, the multilayer foam films described herein can be produced by the blown film process, cast film process, or other suitable methods.

In some embodiments, the polymer composition of each layer may comprise some apt amounts of other additives, such as pigments, slip agents, antistatic agents, UV stabilizers, antioxidants, nucleating agents, or clarifying agents. In some embodiment one of the solid skin layers contains some apt amount of white pigment, for example, less than 1 percent by weight, such as $TiO_2$, Rutile $TiO_2$, Anatase $TiO_2$, Antimony Oxide, Zinc Oxide, Basic Carbonate, White Lead, Lithopone, Clay, Magnesium Silicate, Barytes ($BaSO_4$), Calcium Carbonate ($CaCO_3$), white liquid color, or any other type of additive that may be used as a white color.

In some cases, multilayer foam film can be comprised of two solid skin layers wherein one of the skin layers contains some apt amount of white pigments, for example, less than 1 percent by weight, and the other solid skin contains some apt amount of black pigments, for example, less than 1 percent by weight.

In another exemplary embodiment, at least one of the layers in the multilayer product described herein, excluding the solid skin layers, comprises up to 100% post-consumer regrind, for example, post-consumer or post-industrial polyethylene regrind.

The foam layer optionally may contain 0.05 to 15 percent by weight of an inorganic additive, an organic additive or a mixture of an inorganic and an organic additive as a nucleating agent. For example, the foam layer may contain up to about 15% by weight of talc as a nucleating agent. In some embodiments, at least one layer may include a clarifying agent at less than 1 percent by weight, such as less than 0.5 percent by weight, such as less than 0.1 percent by weight, such as less than 0.05 percent by weight. In some cases, at least one layer of the film may contain up to about 40 wt % of calcium carbonates.

The described multilayer film wherein one of the solid skin layers contains white pigment, comprising at least one foam layer, may have significantly improved perceived surface whiteness compared to known white solid film articles with a similar white pigment concentration. In some embodiments, the described multilayer film wherein one of the solid skin layers comprises white pigment with a concentration less than the white pigment concentration in existing white solid film articles in prior arts, comprising at least one foam layer, may have significantly improved perceived surface whiteness. In an exemplary embodiment, the multilayer foam film, e.g., three-layer foam film with a core foamed layer, wherein one of the solid skins contains less than 1 wt % white pigment (e.g., $TiO_2$) and the other solid skin contains less than 1 wt % black pigment (e.g., carbon black), may have a whiteness index value of more than 80 and a tint index value of less than 1 according to the ISO 11475, also according to the ASTM E313-73, and also according to TAPPI T 525. The sample may have a light intensity (L*), in CIE L*a*b* coordinate, of more than 90 according to ASTM E308, also according to ISO 5631-2.

In another embodiment, a coextruded lightweight multilayer thermoplastic film comprising at least one foam layer including a plurality of cells, wherein at least 10% of the cells are closed cells, and solid layers on each side of the foam layer. The film has an overall thickness equal to or greater than 1 mil, and the bulk density of less than 1 gr/cm³, and one of the solid skin layers contains white pigment wherein the white skin layer has a skin whiteness value of greater than 80 and a skin layer tint value of less than 1 according to the ISO 11475, also according to the ASTM E313-73, and also according to TAPPI T 525. The film has lightness value (L*) of the white skin layer of greater than 90 in CIE L*a*b* dimension according to ASTM E308, also according to ISO 5631-2.

The described films can have a surface with an average Sheffield smoothness, according to TAPPI T 538, of less than 100. In some embodiments, the film may have an average Sheffield smoothness of less than 50; in some cases, less than 40; in some cases, less than 30; and, in some cases, less than 15.

The multilayer foam film can have an overall thickness of greater than 1 mils, in some cases, greater than 8 mils, in some cases, greater than 10 mils, and in some cases greater than 13 mils.

In some embodiments, the lightweight film of this invention has a bulk density less than 1 gr/cm³; in some cases, less than 0.962 gr/cm³; in some cases, less than 0.94 gr/cm³; in some cases, less than 0.9 gr/cm³; in some cases, less than 0.85 gr/cm³; and in some cases, less than 0.8 gr/cm³.

In some embodiments, any foam layer of the disclosed films can have uniformly distributed cells, for example with a closed-cell morphology, an average cell size of about 10-250 μm, an average cell density of about $10^2$-$10^9$ cells/cm³, and an expansion ratio of the foamed layer from 1 to 9. In some cases, the foam layer comprises more than 50% closed cells. In one embodiment, the foam layer has a substantially entirely closed-cell morphology (e.g., greater than 95% closed cells).

In some embodiments various thermoplastics can be used in at least one layer of the multilayer foam film such as polyethylene (PE), polypropylene (PP), Polystyrene (PS), polycarbonate (PC), Poly(methyl methacrylate) (PMMA), polylactic acid (PLA), polyhydroxyalkanoates (PHA), Polyethylene terephthalate (PET), polybutylene terephthalate (PBT), ethylene-vinyl acetate (EVA), ethylene vinyl alcohol (EVOH), polyvinyl chloride (PVC), Polyvinylidene chloride (PVDC), polyamide (PA), LLDPE copolymer which include an α-olefin co-monomer such as butene, hexene, or octene; any of the resins known as TPE family such as, but not limited to, propylene-ethylene copolymer, thermoplastic olefin (TPO), and thermoplastic polyurethane (TPU). In another exemplary embodiment the film has at least one layer comprises an HDPE with a density of 0.94 to 0.962 gr/cm$^3$. In some embodiments the film has at least one layer comprising HDPE with a melt index of 0.02 to 20 dg/min.

In another embodiment, at least one layer, (e.g., excluding the outer skin layers), of the multilayer film described here may comprise LDPE, PP, PA, EVOH, EVA, or PVOH. In one embodiment, the multilayer foam film products described herein may comprise one oxygen barrier layer, or at least one oxygen barrier layer, between the two solid skin layers.

The following examples demonstrate the process of the present disclosure. The examples are only demonstrative and are intended to put no limit on the disclosure with regards to the materials, conditions, or the processing parameters set forth herein.

EXAMPLES

Samples of multilayer HDPE film (three layers) were produced using a blown film line from Windmoeller & Hoelscher Corporation comprising one 105 mm main extruder and two identical 75 mm co-extruders. The core extruder was equipped with a supercritical gas injection unit, capable of injecting nitrogen or carbon dioxide, and a 120 mm MuCell Transfer Mixer, both from MuCell Extrusion LLC. All the films were produced by the blown film process using an annular die with a die gap ranging from 0.45 to 1.3 mm and a blow-up ratio ranging from 1.8:1 to 3.5:1. The lip of the annular die was boron nitride coated.

To characterize the whiteness, tint, light intensity, and the other color characteristic of the samples a spectrophotometer MiniScan EZ from HunterLab was used. The smoothness of the products was evaluated using a Gurley™ 4340 Automatic Densometer & Smoothness Tester.

Table 1 contains the characterization results of the products were made, as non-limiting examples to elucidate this invention. The samples were produced with high-density polyethylene ELITE 5960 from Dow Chemical Company, having the melt index of 0.85 dg/min and the density of 0.962 gr/cm$^3$. In a few samples, a minor fraction of the LDPE 1321 from Dow Chemical Company with the melt index of 0.25 dg/min and the density of 0.921 gr/cm$^3$ was used. A minor fraction of the polypropylene used in few samples was PRB 0131 from Braskem with a melt flow rate of 1.3 dg/min and a density of 0.902 gr/cm$^3$. The calcium carbonate and talc were prepared and introduced as a highly filled masterbatch of, respectively, 80 wt % filled calcium carbonate and 74 wt % filled talc within the PE as the based carrier resin. The foamed core layer of all samples contains up to about 16 wt % talc as the cell nucleating agent. The amount of calcium carbonate used in a few layers of some samples was up to about 38.4 wt %.

All the samples were coextruded with the total throughput of 300 to 500 kg/hr, as it is shown in table 1. The temperature of the mixing section, wherein the supercritical gas was injected, was kept at 190° C. for all the foamed samples. Supercritical nitrogen was used as a physical blowing agent and was injected into the MuCell Transfer Mixer (MTM) at the concentration from 0.045 wt % to 0.065 wt %, very accurately, into the molten polymer.

Samples 1 and 2 are solid monolayer HDPE samples, with the same thickness of 233 μm where sample 2 contains 25% calcium carbonate which resulted in an increase opacity value from about 22 to about 50. The color properties such as whiteness, tint, brightness, and light intensity, excluding the opacity, for samples 1 and 2 were measured with black tile backing which may represent the same films with a black layer. Samples 3 to 8 contain 10.5 wt % TiO$_2$ in the white skin. Even though the structure of these samples is different, all exhibit a whiteness, tint, brightness, and light intensity value in the same range.

Sample 16 is a solid three-layer film wherein the TiO$_2$ concentration in the solid layer was decreased significantly, compared to the samples 3 to 8, to 4.9 wt %. in this sample the measured lightness, L*, deteriorated to 85.4 and the tint value increased to 4.22. The whiteness value, however, did not decrease, although the TiO$_2$ concentration decreased to almost half. This might be because of the UV absorption and blue scattering from the black backing layer which contains almost 0.5 wt % carbon black. Also, the brightness value decreased significantly which might be due to the decrease in TiO$_2$ concentration which influences the scattering.

Sample 10 is the foam version of sample 9, wherein the inclusion of only one foam layer in the middle resulted in a higher amount of light scattering and a significant increase of lightness value (L*); as well as the tint value reduced meaningfully to 0.86. Therefore, sample 10 did exhibit an enhanced perceived surface whiteness compared to sample 9 even though the amount of TiO$_2$ was dramatically reduced compared to the other samples.

TABLE 1

| Sample | 1 | 2 | 3 | 4 | 5 | 6 |
|---|---|---|---|---|---|---|
| ID | Solid Counterpart 1 | Solid Counterpart 2 | 6 Solid | 6A | 6B | 8 Solid |
| Density (gr/cm$^3$) | 0.962 | 1.107 | 1.102 | 0.814 | 0.832 | 1.075 |
| Thickness (um) | 233 | 233 | 244 | 227 | 225 | 214 |
| Basic weight (gr/m$^2$) | 223 | 258 | 268.9 | 184.7 | 187.2 | 230.1 |
| Total Throughput | 400 | 400 | 353.1 | 357.9 | 400 | 353 |

TABLE 1-continued

| Layers | Mono-layer | Mono-layer | A | B | C | A | B | C | A | B | C | A | B |
|---|---|---|---|---|---|---|---|---|---|---|---|---|---|
| HDPE | 100 | 75 | 43 |  | 40 | 45 |  | 40 | 45 |  | 40 | 42 |  |
| 64% talc filled PE |  |  |  | 25 |  |  | 25 |  | 15 | 25 | 15 |  | 46 |
| talc % |  |  | 0 | 16 | 0 | 0 | 16 | 0 | 9.6 | 16 | 9.6 | 29.4 | 0 |
| LDPE % |  |  | 20 | 30 | 20 | 10 | 30 | 10 | 10 | 30 | 10 | 10 | 45 |
| PP % |  |  |  | 30 |  |  | 45 |  |  | 45 |  |  | 30 |
| 80% CaCO3 filled PE |  |  | 32 | 15 | 25 | 43 |  | 35 | 28 |  | 20 |  |  |
| CaCO3% |  | 25 | 25.6 | 12 | 20 | 34.4 | 0 | 28 | 22.4 | 0 | 16 | 0 | 0 |
| 70% TiO2 Masterbatch |  |  | 15 |  |  | 15 |  |  | 15 |  |  | 15 |  |
| 40% Carbon Black Masterbatch |  |  |  |  | 2 |  |  | 2 |  |  | 2 |  |  |
| TiO2 % |  |  | 10.5 |  |  | 10.5 |  |  | 10.5 |  |  | 10.5 |  |
| Carbon Black % |  |  |  |  | 0.8 |  |  | 0.8 |  |  | 0.8 |  |  |
| Layer Thickness (um) |  |  | 42 | 137 | 65 | 30 | 137 | 60.2 | 32.7 | 126 | 66.1 | 40 | 134 210 |
| Throughput (kg/hr) |  |  | 64.3 | 190 | 98.8 | 72.7 | 140 | 145 | 85 | 144 | 171 | 71.5 |  |
| Whiteness (WIE) | 106.67 | 68.21 | 89.8 |  |  | 88.5 |  |  | 86.1 |  |  | 89.7 |  |
| Tint | 7.7 | 2.34 | 2.83 |  |  | 2.5 |  |  | 2.15 |  |  | 3.06 |  |
| Brightness (Y) | 18.8 | 41.27 | 79 |  |  | 79.9 |  |  | 80.3 |  |  | 77.1 |  |
| L* | 50.45 | 70.36 | 91.2 |  |  | 91.6 |  |  | 91.8 |  |  | 90.3 |  |
| Opacity | 22.1 | 49.57 | 100 |  |  | 100 |  |  | 100 |  |  | 100 |  |
| Smoothness (Sheffield) | 10 | 10 | 19 |  |  | 43 |  |  | 37 |  |  | 15.4 |  |

| Sample | 7 | | | 8 | | | 9 | | | 10 | | |
|---|---|---|---|---|---|---|---|---|---|---|---|---|
| ID | 8C | | | 8E | | | 16 Solid | | | 16 | | |
| Density (gr/cm$^3$) | 0.865 | | | 0.912 | | | 1.134 | | | 0.82 | | |
| Thickness (um) | 282 | | | 275 | | | 230 | | | 307 | | |
| Basic weight (gr/m$^2$) | 243.8 | | | 250.7 | | | 260.9 | | | 251.8 | | |
| Total Throughput | 400 | | | 400 | | | 500 | | | 500 | | |
| Layers | C | A | B | C | A | B | C | A | B | C | A | B | C |

| Layers | A | B | C | A | B | C | A | B | C | A | B | C |
|---|---|---|---|---|---|---|---|---|---|---|---|---|
| HDPE | 40 | 40 |  | 40 | 45 |  | 45 | 65 | 50 | 65 | 65 | 50 | 65 |
| 64% talc filled PE | 35 |  |  |  |  | 25 |  |  | 20 |  |  | 20 |  |
| talc % | 22.4 | 0 | 0 | 0 | 0 | 16 | 0 | 0 | 12.8 | 0 | 0 | 12.8 | 0 |
| LDPE % | 10 | 30 | 45 | 25 | 53 | 45 | 40 |  |  |  |  |  |  |
| PP % |  |  | 30 |  |  |  | 30 |  |  |  |  |  |  |
| 80% CaCO3 filled PE |  | 28 |  | 20 |  |  |  |  | 29.8 | 30 | 28 | 29.8 | 30 | 28 |
| CaCO3% | 0 | 22.4 | 0 | 16 | 0 | 0 | 0 | 23.8 | 24 | 22.4 | 23.8 | 24 | 22.4 |
| 70% TiO2 Masterbatch |  | 15 |  |  | 15 |  |  | 7 |  |  | 7 |  |  |
| 40% Carbon Black Masterbatch | 2 |  |  | 2 |  |  | 2 |  |  | 1.2 |  |  | 1.2 |
| TiO2 % |  | 10.5 |  |  | 10.5 |  |  | 4.9 |  |  | 4.9 |  |  |
| Carbon Black % | 0.8 |  |  | 0.8 |  |  | 0.8 |  |  | 0.48 |  |  | 0.48 |
| Layer Thickness (um) | 40 | 51 | 181 | 50 | 50 | 174 | 51.3 | 45 | 140 | 45 | 45 | 217 | 45 |
| Throughput (kg/hr) | 71.3 | 87.3 | 222 | 90.8 | 75.1 | 244 | 80.7 | 100 | 300 | 99.7 | 104 | 293 | 103 |
| Whiteness (WIE) |  | 87.6 |  |  | 87 |  |  | 86.4 |  |  | 80.1 |  |  |
| Tint |  | 2.22 |  |  | 2.17 |  |  | 4.22 |  |  | 0.86 |  |  |
| Brightness (Y) |  | 79.7 |  |  | 79.4 |  |  | 66.8 |  |  | 77.1 |  |  |
| L* |  | 91.5 |  |  | 91.4 |  |  | 85.4 |  |  | 90.4 |  |  |
| Opacity |  | 100 |  |  | 100 |  |  | 100 |  |  | 100 |  |  |
| Smoothness (Sheffield) |  | 23 |  |  | 127 |  |  | 35.8 |  |  | 10.7 |  |  |

The invention claimed is:

1. A coextruded lightweight opaque multilayer thermoplastic film, comprising:
   at least one foam layer comprising a plurality of cells, wherein at least 10% of the cells are closed cells, an average cell size of 10 to 100 μm, and a cell density of $10^2$ to $10^9$ cells/cm$^3$; and
   solid skin layers comprising a white solid skin layer on a side of the at least one foam layer and a darker non-white solid skin layer on an opposing side of the at least one foam layer, the white solid skin layer containing white pigment in an amount of less than 1 percent by weight and the darker non-white solid skin layer containing darker non-white pigment,
   wherein the multilayer film has an overall thickness equal to or greater than 1 mil and a film density from 0.1 to 0.9 g/cm$^3$, and
   wherein the multilayer film has a skin layer whiteness index value of greater than 80 according to ASTM E313-73, a skin layer tint value of less than 1 according to ASTM E313-73, and a skin layer lightness value (L*) of greater than 90 in CIE L*a*b* dimension according to ASTM E308.

2. The multilayer film of claim 1, wherein the white pigment comprises one or more of the following: Titanium Oxide (TiO$_2$), Rutile TiO$_2$, Anatase TiO$_2$, Antimony Oxide, Zinc Oxide, Basic Carbonate, White Lead, Lithopone, Clay, Magnesium Silicate, Barytes (BaSO$_4$).

3. The multilayer film of claim 2, wherein the white pigment comprises TiO$_2$.

4. The multilayer film of claim 1, wherein the darker nonwhite solid skin layer is a black solid skin layer and the darker nonwhite pigment is black pigment.

5. The multilayer film of claim 1, wherein the multilayer film has an average Sheffield smoothness of less than 100 according to TAPPI T 538.

6. The multilayer film of claim 4, wherein the black pigment comprises carbon black in an amount of less than 1 percent by weight.

7. The multilayer film of claim 1, wherein the at least one foam layer comprises an HDPE with a density of 0.94 to 0.962 gr/cm$^3$.

8. The multilayer film of claim 1, wherein at least one of the solid skin layers comprises an HDPE with a density of 0.94 to 0.962 gr/cm$^3$.

9. The multilayer film of claim 1, wherein at least one layer contains slip agents, antistatic agents, UV stabilizers, antioxidants, calcium carbonate, or talcum.

10. The multilayer film of claim 1, wherein the multilayer film comprises three, five, seven, eight or nine layers.

11. The multilayer film of claim 1, more than 50% of the cells are closed cells.

12. The multilayer film of claim 1, wherein the at least one foam layer comprises a nucleating agent of 0.05 to 15 percent by weight of an inorganic additive, an organic additive, or a mixture of an inorganic and an organic additive.

13. The multilayer film of claim 1, wherein at least one layer comprises HDPE with a melt index of 0.02 to 20 dg/min.

14. The multilayer film of claim 1, wherein at least one layer, excluding the solid skin layers, comprises one of LDPE, LLDPE, PP, PA, EVOH, EVA, or PVOH.

15. The multilayer film of claim 1, wherein at least one layer, excluding the solid skin layers, comprises up to 100% post-consumer regrind.

16. The multilayer film of claim 1, wherein at least one layer, excluding the solid skin layers, comprises clay.

17. An article comprising the multilayer film of claim 1.

18. The article of claim 1, comprises one or more of the following: fast food packaging;
   packaging of dry food products; packaging of frozen foods; backing board for fresh products; packaging of baked food; packaging of liquid food and beverages; packaging of laundry detergents, shampoos, and body washes; pouches; stand-up pouches; sachets; pet food boxes; grocery boxes; aseptic packaging; packaging of baby foods; packaging of desserts; a surface protection article; light blocking article; and signage.

19. A process of making the multilayer film of claim 1, wherein supercritical blowing agent is introduced, with an injection pressure of more than 240 bar at a concentration of less than 0.065 weight percent, into a molten resin inside a mixing section of an extruder during the process.

* * * * *